United States Patent [19]

Pav et al.

[11] Patent Number: 4,813,349

[45] Date of Patent: Mar. 21, 1989

[54] ROLL CALENDAR SYSTEM WITH DIFFERENT SIZE HYDROSTATIC SUPPORTING ELEMENTS

[75] Inventors: Josef Pav; Reinhard Wenzel, both of Krefeld, Fed. Rep. of Germany

[73] Assignee: Kleinewefers GmbH, Krefeld, Fed. Rep. of Germany

[21] Appl. No.: 35,635

[22] Filed: Apr. 7, 1987

[30] Foreign Application Priority Data

Apr. 9, 1986 [DE] Fed. Rep. of Germany ....... 3611858

[51] Int. Cl.⁴ .......................... B21B 29/00; B21B 13/02
[52] U.S. Cl. ............................... 100/162 B; 29/116.1; 72/243; 100/93 RP; 100/170
[58] Field of Search .......... 29/116 A, 113 AD, 116 R, 29/116.1, 113.1; 100/162 B, 93 RP, 170, 176; 72/241, 243, 245

[56] References Cited

U.S. PATENT DOCUMENTS

| | | | |
|---|---|---|---|
| 3,997,953 | 12/1976 | Christ et al. | 29/116 AD |
| 4,327,468 | 5/1982 | Kusters et al. | 29/116 AD |
| 4,328,744 | 5/1982 | Pav et al. | 100/162 B |
| 4,435,971 | 3/1984 | Schuwerk | 29/113 AD |
| 4,498,383 | 2/1985 | Pav et al. | 100/162 B |
| 4,520,723 | 6/1985 | Pav et al. | 100/162 B |
| 4,625,637 | 12/1986 | Pav et al. | 100/162 B |
| 4,633,774 | 1/1987 | Koosa et al. | 100/162 B |

FOREIGN PATENT DOCUMENTS

| | | |
|---|---|---|
| 2632452 | 1/1978 | Fed. Rep. of Germany ... 100/162 B |
| 3049080 | 7/1982 | Fed. Rep. of Germany ... 100/162 B |
| 3325385 | 1/1985 | Fed. Rep. of Germany ... 100/162 B |
| 2226508 | 11/1974 | France . |
| 2441087 | 6/1980 | France . |
| 590732 | 8/1977 | Switzerland . |
| 2060822 | 5/1981 | United Kingdom . |

*Primary Examiner*—Andrew M. Falik
*Attorney, Agent, or Firm*—Peter K. Kontler

[57] ABSTRACT

A system of rolls for use in a calender has an end roll with a fixed carrier and a deformable hollow cylindrical shell surrounding the carrier with freedom of radial movement and defining with a neighboring roll an elongated nip for a running web of paper, textile material or the like. The end roll has a row of primary hydrostatic supporting elements disposed between the carrier and the shell adjacent the nip and a row of secondary hydrostatic supporting elements diametrically opposite the row of primary supporting elements. The bearings between the end portions of the shell and the carrier surround rings which are movable relative to the carrier radially of the shell and can be arrested in selected positions by cylinder and piston units which are connected to a source of pressurized fluid by way of shutoff valves. The areas of those surfaces of at least some primary supporting elements which are adjacent the internal surface of the shell are greater than the corresponding areas of at least some secondary supporting elements. This contributes to a reduction of friction and to a reduction of the temperature of the shell.

13 Claims, 6 Drawing Sheets

ROLL CALENDAR SYSTEM WITH DIFFERENT SIZE HYDROSTATIC SUPPORTING ELEMENTS

BACKGROUND OF THE INVENTION

The invention relates to rolls for use in calenders and like machines, and more particularly to improvements in systems of rolls wherein one or more rolls have deformable hollow cylindrical shells and are rotatable with radial play about stationary carriers with the interposition of preferably hydrostatic supporting elements. Still more particularly, the invention relates to improvements in systems of rolls wherein the supporting elements include a row of primary supporting elements adjacent the nip which the deformable shell defines with an adjacent roll, and a row of secondary supporting elements substantially diametrically opposite the row of primary supporting elements.

Commonly owned German Offenlegungsschrift No. 33 25 385 discloses a roll wherein the primary supporting elements are identical with the secondary supporting elements and wherein the pressure generating devices (such as cylinder and piston units) for the primary supporting elements are identical with the pressure generating devices for the secondary supporting elements. Each supporting element has an exposed surface which is adjacent the internal surface of the shell and has a pocket which receives hydraulic fluid from the associated pressure generating device by way of a throttling channel. The pressure of hydraulic fluid which is being admitted into the pockets of the supporting elements is variable to thereby alter the profile of the shell and to regulate the width of selected portions of the nip between the shell and the periphery of the adjacent roll. The films of hydraulic fluid between the internal surface of the shell and the surfaces of the supporting elements reduce friction to a value well below that which would develop in response to the establishment of direct mechanical contact between the shell and the supporting elements.

The quality of the web (e.g., a continuous strip of paper, metal or plastic) which is treated while running through the nip of the shell and the adjacent roll depends to a large extent upon the accuracy of regulation of pressure in the pockets of the supporting elements and in the pressure generating devices. The force with which the primary and secondary supporting elements are urged toward the internal surface of the shell determines the dimensions of the nip as well as the force which is applied to the running web. In addition, the rows of primary and secondary supporting elements (such rows are disposed substantially diametrically opposite each other) exert a pronounced stabilizing influence by opposing lateral movements of the shell.

The aforedescribed roll operates quite satisfactorily except that the shell is often heated to an elevated temperature and that it is not readily possible to maintain each and every portion (especially the end portions) of the roll at a desired distance from the respective portions of the adjacent roll or rolls.

Localized heating of the shell forming part of the roll which is disclosed in the Offenlegungsschrift is attributable to randomly occurring friction between the secondary supporting elements and the internal surface of the shell. The force with which the primary supporting elements urge the shell toward the adjacent roll is greater than the force with which the secondary supporting elements urge the shell away from such roll. This is deemed necessary in order to ensure that the nip of the cooperating rolls will have a desired width and that the material running through the nip will be subjected to a predictable calendering or other treatment. The magnitude of the forces is regulated by regulating the pressure of hydraulic fluid in the pockets of the primary and secondary supporting elements. Since the dimensions of convex surfaces of the primary supporting elements are the same as those of the convex surfaces of the secondary supporting elements, and the dimensions of pockets in all of the convex surfaces are also the same, the pressure of fluid in the pockets of the secondary supporting elements must be less than the pressure in the pockets of the primary supporting elements. It can happen that the pressure in the pockets of the primary supporting elements is too low to enable the primary supporting elements to act as hydrostatic bearings, i.e., the liquid films between the convex surfaces of the secondary supporting elements and the internal surface of the shell are too thin so that portions of or the entire convex surfaces of the secondary supporting elements come in direct (metal-to-metal) contact with the shell. One can speak of mixed friction including hydraulic and metallic friction. Such mixed friction is more pronounced than a pure hydraulic friction and leads to unexpected and undesirable localized heating of the shell.

Somewhat similar rolls are disclosed in German Offenlegungsschrift No. 30 49 080 and in German Auslegeschrift No. 26 32 452.

OBJECTS AND SUMMARY OF THE INVENTION

An object of the invention is to provide a novel and improved roll for use in a calender or a like machine and to construct and mount the roll in such a way that it is subjected to a less pronounced heating action than a conventional roll.

Another object of the invention is to provide the roll with novel and improved means for ensuring retention of the end portions of the deformable shell of such roll at a desired distance from the neighboring roll or rolls.

A further object of the invention is to provide the roll with novel and improved groups of primary and secondary supporting elements.

An additional object of the invention is to provide a novel and improved method of maintaining the temperature of the above outlined roll within a predetermined range.

Still another object of the invention is to provide a novel and improved system of rolls wherein at least one of the rolls is constructed in the above outlined manner.

A further object of the invention is to provide a machine, such as a calender, which embodies the above outlined roll or the above outlined system of rolls.

One feature of the invention resides in the provision of a system of rolls for use in calenders and like machines. The improved system comprises at least one roll which includes a carrier, a deformable hollow cylindrical shell which rotatably surrounds the carrier and is movable radially with respect thereto, first supporting elements which form at least one first row and are interposed between the carrier and the cylindrical internal surface of the shell, and second supporting elements forming between the carrier and the internal surface of the shell at least one second row opposite the first row or rows. The supporting elements have exposed surfaces which are adjacent the internal surface of the shell, and the external surfaces of at least some of the second supporting elements are smaller than the exposed surfaces of the first supporting elements. The supporting elements are preferably hydrostatic supporting elements; their exposed surfaces are then provided with pockets for a pressurized hydraulic fluid (such as oil). Adjustable pressure generating devices are provided to urge the supporting elements toward the internal surface of the shell, and such roll further comprises means for adjusting the pressure generating devices to thereby vary the force with which the respective supporting elements are urged toward the internal surface of the shell. The pressure generating devices for the first supporting elements can include groups of several cylinder and piston units each. The units of each group are preferably adjacent one another as seen in the circumferential direction of the shell.

Each pressure generating device can include at least one cylinder and piston unit, and the pistons of at least some units for the second supporting elements can have cross-sectional areas which are smaller than those of the pistons in the cylinder and piston units for the first supporting elements. For example, the cross-sectional areas of at least some pistons in the cylinder and piston units for the second supporting elements can equal or approximate fifty percent of the cross-sectional area of the piston in a cylinder and piston unit for a first supporting element. Analogously, the areas of exposed surfaces of at least some second supporting elements can equal or approximate fifty percent of the area of the exposed surface of a first supporting element.

The supporting elements of the second row can be more distant from one another than the supporting elements of the first row. Alternatively, or in addition to such distribution of supporting elements, the two outermost first supporting elements can be located nearer to the respective ends of the shell than the two outermost second supporting elements.

A substantially annular support can be provided for each end portion of the shell. The supports surround the carrier within the respective end portions and are movable relative to the carrier radially of the shell. Such roll further comprises means for arresting the supports in selected positions with reference to the carrier. The arresting means can comprise at least one fluid-operated cylinder and piston unit for each support. These units operate between the carrier and the respective supports, and the arresting means including such units further comprises a source of pressurized fluid (e.g., a pump) conduit means connecting the source with the units, and flow regulating valve means (e.g., shutoff valves) in the conduits between the source and each of the units.

The system of rolls further comprises at least one second roll which defines with the deformable shell a nip for the passage of running sheet material. The first row of supporting elements is adjacent the nip.

The system can include at least three rolls including two outer rolls and at least one additional or intermediate roll between the outer rolls. The outer rolls can comprise deformable shells and first and second supporting elements which are distributed and dimensioned as described above.

The novel features which are considered as characteristic of the invention are set forth in particular in the appended claims. The improved system of rolls itself, however, both as to its construction and its mode of operation, together with additional features and advantages thereof, will be best understood under perusal of the following detailed description of certain specific embodiments with reference to the accompanying drawing.

DESCRIPTION OF THE PREFERRED EMBODIMENTS

Figure 1:
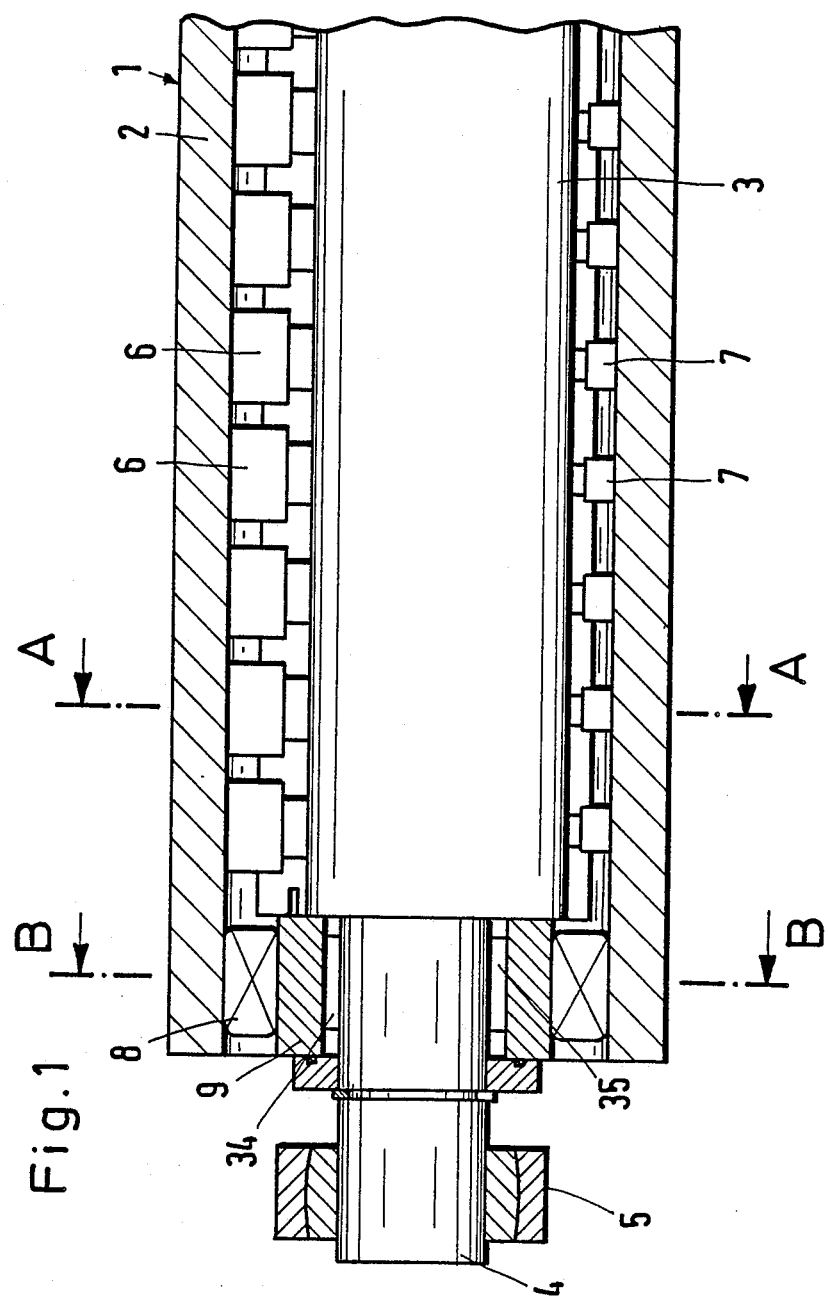
FIG. 1 is a fragmentary axial sectional view of a roll which forms part of the improved system of rolls and wherein the number of secondary supporting elements matches the number of primary supporting elements.
Figure 2:
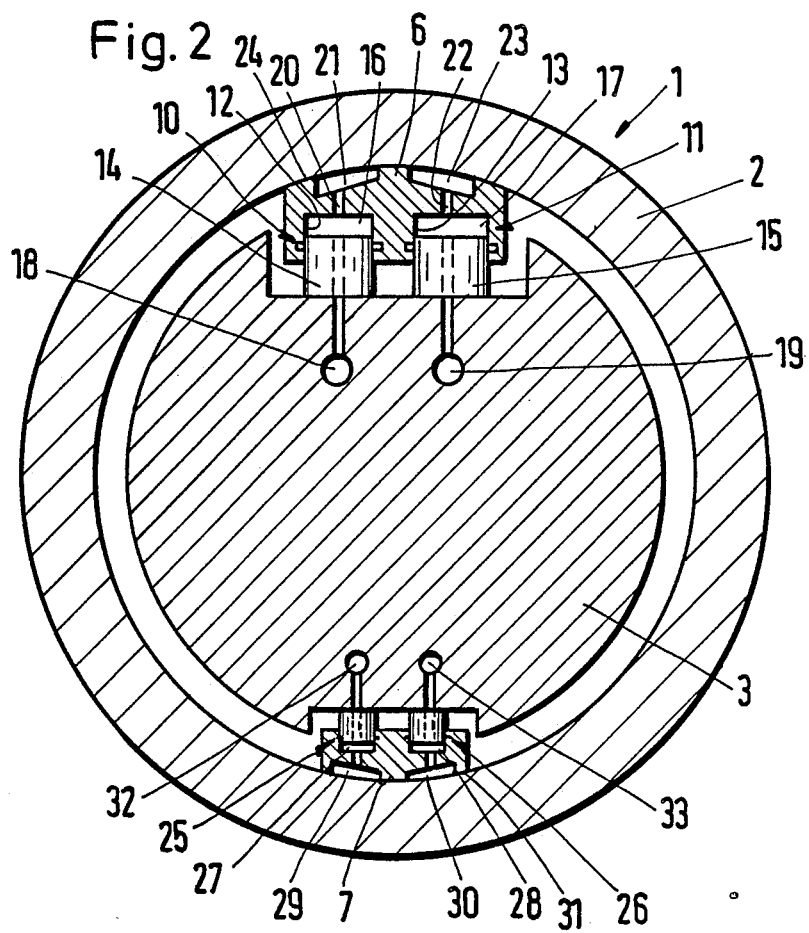
FIG. 2 is an enlarged transverse vertical sectional view as seen in the direction of arrows from the line A—A in FIG. 1 and shows the details of one primary and one secondary supporting element.
Figure 3:
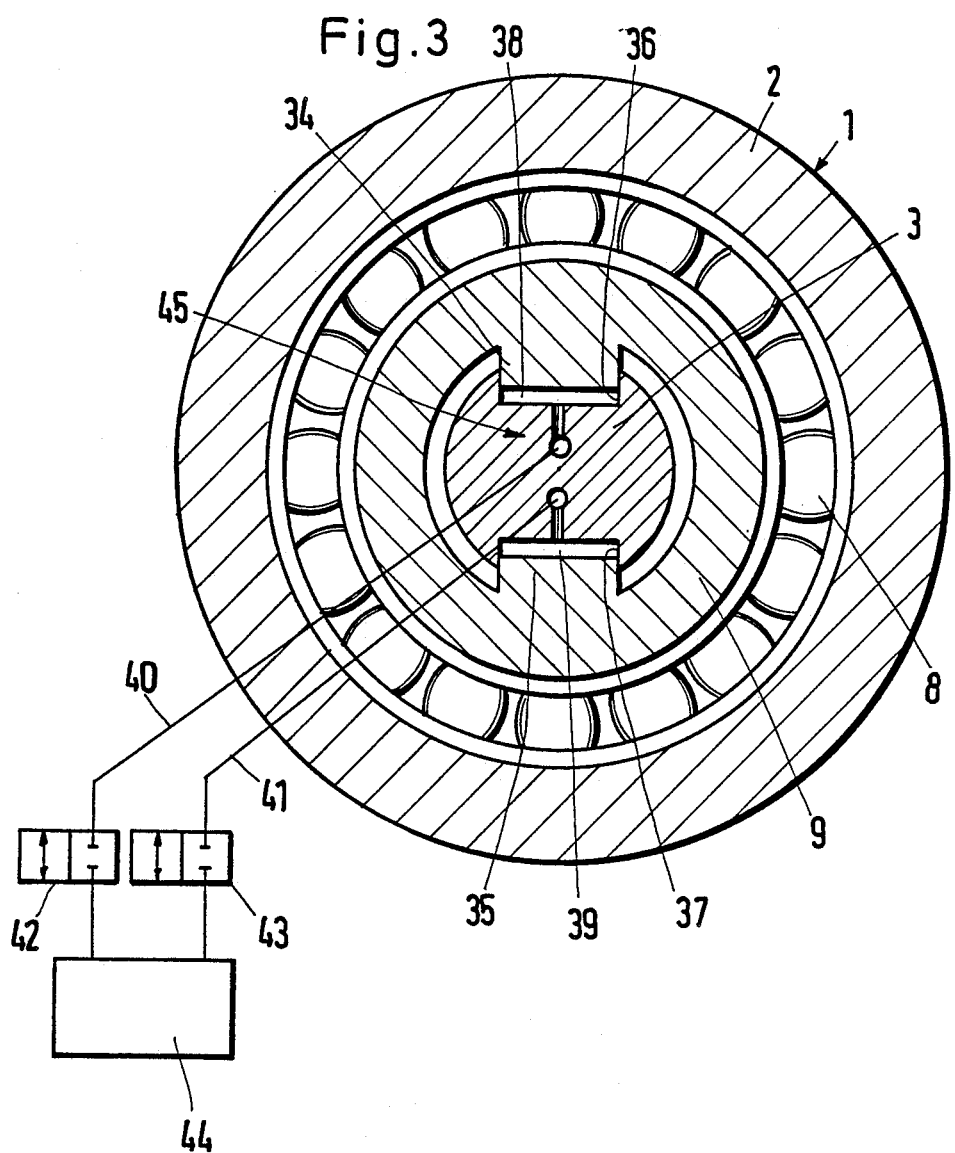
FIG. 3 is an enlarged transverse vertical sectional view as seen in the direction of arrows from the line B—B of FIG. 1 and shows the details of arresting means for the support at one axial end of the shell.

FIGS. 1 to 3 show a roll 1 which comprises a non-rotatable elongated carrier 3 and a rotary hollow cylindrical shell 2 which surrounds the carrier and is movable radially with respect thereto. The end portions 4 of the carrier 3 are non-rotatably received in spherical bearings 5 (only one end portion 4 and only one bearing 5 shown in FIG. 1), and the bearings 5 are mounted in a suitable frame, e.g., in the frame of a calender or a like machine.

The roll 1 further comprises a row of equidistant primary supporting elements 6 and a row of equidistant secondary supporting elements 7. The two rows are located substantially diametrically opposite each other with reference to the axis of the shell 2 and the external surfaces of the supporting elements 6 are adjacent the cylindrical internal surface of the shell. The primary supporting elements 6 form several groups of two neighboring elements each, and the pressure of hydraulic fluid which acts upon a group of elements 6 is preferably the same. The same preferably applies for the secondary supporting elements 7.

The end portions of the shell 2 surround antifriction bearings 8 which, in turn, surround annular supports 9 (hereinafter called rings for short). The rings 9 are movable with reference to the carrier 3 radially of the shell 2 and they can be arrested in selected positions by arresting units 45 one of which is shown in FIG. 3. The rings 9 cannot rotate with the shell 2. FIG. 1 merely shows a single bearing 8 and a single ring 9.

FIG. 2 shows the details of the pressure generating devices for the primary and secondary supporting elements 6 and 7. Each supporting element 6 is acted upon by two pressure generating devices 10, 11 each of which constitutes a hydraulic cylinder and piston unit, and the devices 10, 11 are adjacent each other as seen in the circumferential direction of the shell 2. The cylinder of each pressure generating device is the adjacent portion of the primary supporting element 6 which has two parallel cylinder bores 12, 13 for pistons 14, 15 which are integral or rigidly connected with the carrier 3. The pistons 14, 15 define with the respective supporting element 6 two cylinder chambers 16, 17 receiving pressurized hydraulic fluid from conduits 18, 19 which extend in part axially of the carrier 3 and in part radially outwardly through he pistons 14, 15. The external surface 24 of each supporting element 6 has two shallow recesses or pockets 21, 23 which communicate with the cylinder chambers 16, 17 by way of throttling channels 20, 22 in the supporting element 6. The source of pressurized hydraulic fluid which is connected or connectable with the conduits 18, 19 and the means for regulating the pressure of fluid in the conduits 18, 19 are not shown. Reference may be had to commonly owned U.S. Pat. Nos. 4,520,723, 4,498,383 and 4,625,637.

The fluid which enters the pockets 21, 23 leaks along the lands which surround the pockets 21, 23 and flows into the interior of the shell 2. Such fluid forms a layer of lubricant between the external surface 24 of the primary supporting element 6 and the internal surface of the shell 2.

Each secondary supporting element 7 is acted upon by two pressure generating devices 25 and 26 which are adjacent each other as seen in the circumferential direction of the shell 2. As shown, the supporting element 7 of FIG. 2 has two chambers for pistons which are provided on the carrier 3 and define with the supporting element 7 two cylinder chambers 27, 28 in communication with recesses or pockets 29, 30 in the external surface 31 of the element 7 by way of flow restricting channels extending through the supporting element 7. The chambers 27, 28 receive pressurized fluid from the source (not shown) by way of conduits 32, 33 which extend in part through the carrier 3 and in part through the respective pistons. The area of the exposed surface 31 is much smaller than that of the exposed surface 24. The means for regulating the pressure of hydraulic fluid in the conduits 32 and 33 is not shown in FIG. 2. Reference may be had to the aforementioned U.S. patents of the assignee.

The cross-sectional areas of pistons forming part of the pressure generating devices 25, 26 are much smaller than the cross-sectional areas of the pistons 14 and 15. This necessitates the establishment of higher hydraulic pressures in the cylinder chambers 27, 28. However, friction between the external surface 31 and the internal surface of the shell 2 is much less than if the area of the surface 31 were to match the area of an external surface 24 so that the shell 2 is subjected to a much less pronounced friction-induced heating action and the force which is required to rotate the shell 2 about the carrier 3 is greatly reduced.

The external surface 24 can be said to include the surfaces of the lands around the pockets 21, 22 as well as the surfaces at the bottoms of these pockets. Analogously, the external surface 31 can be said to include the surfaces at the bottoms of the pockets 29, 30 plus the surfaces of lands around these pockets. Reduction of friction is attributable primarily to the fact that the areas of surfaces on the lands around the pockets 29, 30 are considerably smaller than the areas of the lands around the pockets 21 and 22.

FIG. 3 shows that the arresting unit 45 for one of the rings 9 comprises two hydraulic cylinder and piston units which can receive a hydraulic fluid (e.g., oil) from a source 44 by way of conduits 40, 41 which contain pressure regulating shutoff valves 42 and 43. Each cylinder and piston unit comprises a piston (34, 35) which is an integral or separable part of the ring 9 and a cylinder which is an integral part of the carrier 3. The latter has two cylindrical bores 36, 37 for the respective pistons 34, 35 which define cylinder chambers 38, 39 in communication with the conduits 40, 41, respectively. Sealing rings (not shown) are recessed into the peripheral surfaces of the pistons 34, 35 and/or into the surfaces surrounding the bores 36, 37.

The arresting unit 45 can fix the ring 9 in any selected position with reference to the carrier 3, as seen in the radial direction of the shell 2. The arresting unit 45 further serves to hold the ring 9 against rotation around the carrier 3.

If the position of the ring 9 with reference to the carrier 3 is to be changed solely in response to the action of pressure generating devices 10, 11 and/or 25, 26, the valves 42, 43 are opened and the source 44 admits pressurized fluid into the chambers 38, 39 to fill these chambers with hydraulic fluid before the valves 42, 43 are closed. This can be achieved by using a source 44 wherein the pressure of fluid barely suffices to keep the chambers 38, 39 filled with hydraulic fluid.

Alternatively, the source 44 can contain a supply of hydraulic fluid which is maintained at an elevated pressure sufficing to ensure that the ring 9 and the respective end portion of the shell 2 can be shifted against the action of external forces. The valves 42, 43 are closed again as soon as the hydraulic fluid has moved the ring 9 to a selected position. The ring 9 and the respective end portion of the shell 2 is then held in a selected position as reliably as if the ring 9 were rigid with the carrier 3.

As a rule, the pistons 34 and 35 are manufactured independently of the ring 9 and are thereupon rigidly secured to the ring. Alternatively, and as shown in FIG. 3, the pistons 34 and 35 can constitute integral parts of the ring 9. If the pistons 34, 35 are produced independently of the ring 9, they are inserted into the respective cylinder bores 36, 37 before the ring 9 is slipped over them and is secured thereto by screws (not shown) or by other suitable fasteners.

An advantage of arresting units 45 is that the end portions of the axis of the shell 2 can be fixed in selected positions relative to the carrier 3 with a high degree of accuracy and reliability. This renders it possible to greatly reduce the magnitude of forces which must be furnished by the supporting elements 6 and/or 7 to maintain the shell in a selected position. This, in turn, normally results in the generation of less heat which is generated as a result of friction between the internal surface of the shell and the supporting elements. It is possible, in many instances, to minimize the sum of all forces which the supporting elements transmit to the shell 2. At the very least, the provision of arresting devices for the rings 9 renders it possible to operate without secondary supporting elements close to the end portions of the shell 2. The volume of a cylinder chamber 38 increases if the volume of the respective cylinder chamber 39 decreases and vice versa. The source 44 ensures that both cylinder chambers of each arresting unit 45 are filled with a suitable hydraulic fluid so that the bodies of fluid in the respective cylinder chambers act as solid blocks as soon as the shutoff valves 42 and 43 are closed.

An important advantage of the improved roll is that friction between the internal surface of the shell 2 and the external surfaces 31 of the secondary supporting elements 7 is much less than that between the shell 2 and the external surfaces 24 of the primary supporting elements 6. This also entails the generation of less heat, i.e., the temperature of the shell 2 is relatively low. Moreover, the drive means (not shown) for the shell 2 consumes less energy. As mentioned above, the pressure of hydraulic fluid in the pockets 29, 30 of the relatively small external surfaces 31 is or can be higher than that in the pockets 21, 23 in order to ensure that the secondary supporting elements 7 can take up forces which equal or approximate those taken up by the primary supporting elements 6. However, and since the secondary supporting elements 7 are often called upon to take up and to transmit forces which do not match those taken up and transmitted by the primary supporting elements 6, it normally does not present any problems to maintain the pressures in the pockets 29, 30 within the limits of acceptable standard operating pressures.

A reduced generation of heat is highly desirable because it entails a substantial reduction of the temperature of the entire roll 1 as well as a substantial reduction of localized temperature peaks. This is of particular importance in connection with rolls whose shells are surrounded by elastic layers of paper, synthetic plastic or other material. The elastic layers normally interfere with rapid dissipation of heat and they are likely to be damaged, destroyed or become useless for other reasons as soon as their temperature reaches a relatively low upper limit.

A reduction of temperature peaks in the region of secondary supporting elements 7 is desirable because the temperature-dependent sphericity is reduced and the regulation of the width of the nip is simplified. Undesirable partial heating can be reduced if the secondary supporting elements 7 are equidistant from each other.

As mentioned above, the cross sectional area of each piston 14 or 15 can exceed the cross-sectional areas of at least some pistons in the pressure generating devices 25, 26 for the secondary supporting elements 7. Since the pressure of hydraulic fluid in the pockets is increased anyway, a correspondingly increased pressure can be resorted to even if the dimensions of the pressure generating devices 25, 26 are reduced. It has been found in actual practice that the roll 1 operates quite satisfactorily if the cross-sectional areas of the pistons in the pressure generating devices 25, 26 equal or approximate 50 percent of the cross sectional areas of the pistons 14 and 15.

Figure 4:
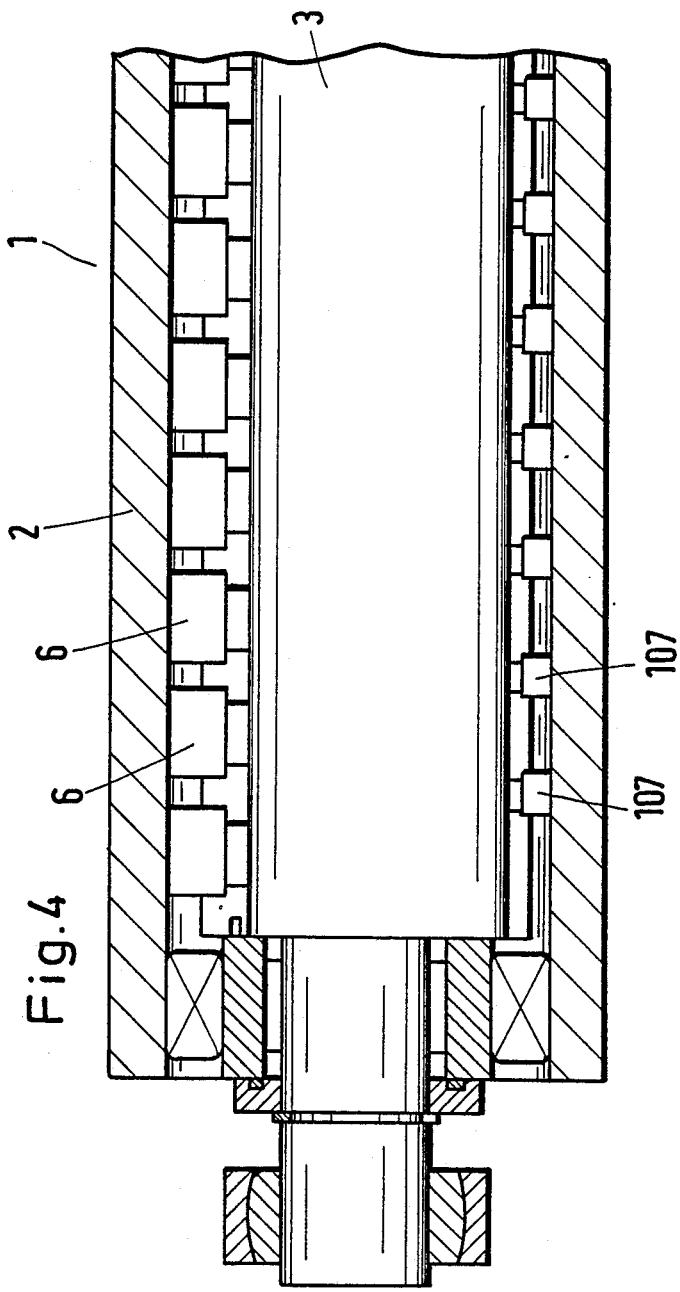
FIG. 4 is a fragmentary axial sectional view of a modified roll wherein the secondary supporting elements are staggered with reference to the primary supporting elements.

FIG. 4 shows a portion of a modified roll 1 wherein the secondary supporting elements 107 are staggered with reference to the primary supporting elements 6 and the two outermost primary supporting elements 6 are nearer to the respective end portions of the shell 2 than the corresponding outermost secondary elements 107. In all other respects, the roll 1 of FIG. 4 is or can be identical with the roll of FIGS. 1 to 3. The arrangement of FIG. 4 reduces the likelihood of cambering at the ends of the shell 2. Furthermore, the negative forces which are generated by the secondary supporting elements 107 normally suffice if the secondary supporting elements are equidistant from each other.

Figure 5:
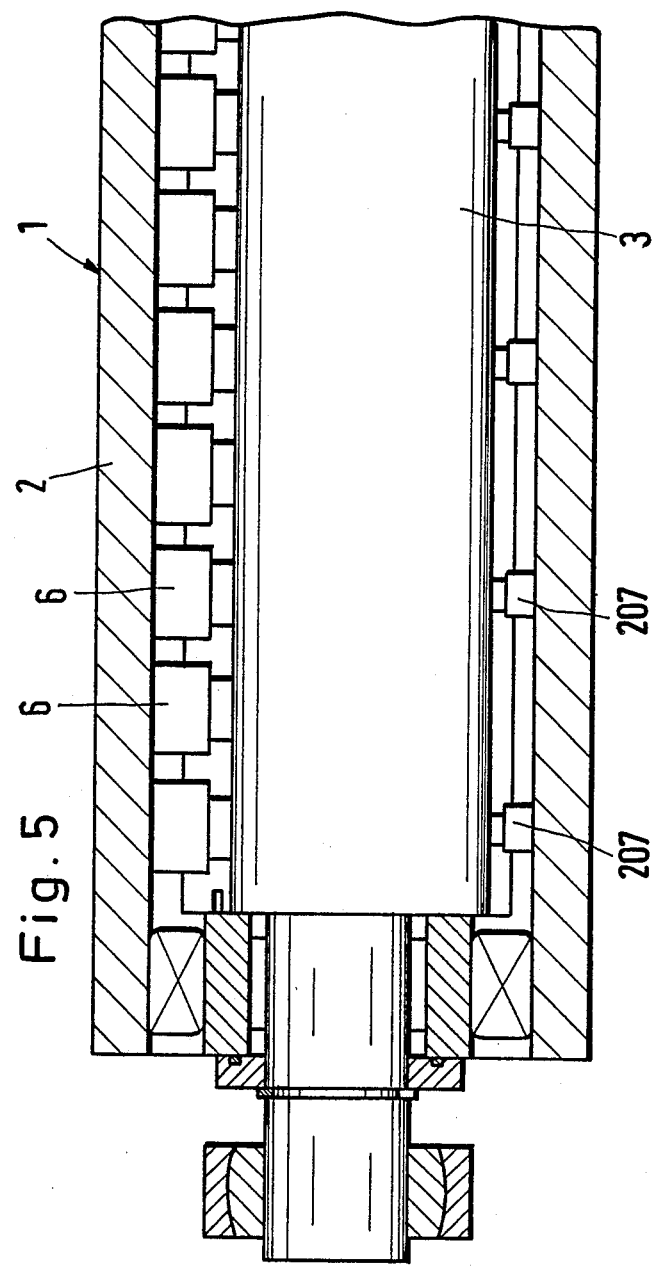
FIG. 5 is a fragmentary axial sectional view of a third roll wherein the number of primary supporting elements exceeds the number of secondary supporting elements.

FIG. 5 illustrates a third roll 1 wherein the mutual spacing of secondary supporting elements 207 is much greater than that of the primary supporting elements 6. In all other respects, the roll of FIG. 5 is or can be identical with or analogous to the roll of FIGS. 1 to 3. The reduced number of secondary supporting elements 207 normally suffices to furnish the entire required negative force; if necessary, the pressure of hydraulic fluid which is supplied to the cylinder and piston units of the secondary supporting elements 207 is increased accordingly. The arrangement of FIG. 5, wherein the number of secondary supporting elements 207 is or can be only half the number of primary supporting elements, entails a further reduction of friction between the secondary supporting elements and the internal surface of the shell 2.

Figure 6:
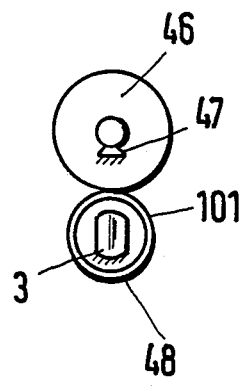
FIG. 6 is a smaller-scale end elevational view of a system of two rolls wherein at least one of the rolls is constructed in a manner as shown in FIGS. 1-3, FIG. 4 or FIG. 5.

The system of rolls 46, 101 which are shown in FIG. 6 includes a lower roll 101 which corresponds to the roll 1 of FIGS. 1 to 3, FIG. 4 or FIG. 5 and a second roll 46 the end portions of which are mounted in fixed bearings 47. The shell of the roll 101 has an elastically deformable outer layer 48 which defines with the roll 46 an elongated nip extending at right angles to the plane of FIG. 6. The layer 48 can be made of paper or a synthetic plastic material. The roll 46 may be identical with the roll 1 of FIGS. 1 to 3, FIG. 4 or FIG. 5; the stationary bearings 47 are then formed by the rings 9 in conjunction with the respective arresting units 45 to hold the end portions of the shell of the roll 46 at a fixed level above the carrier 3 of the roll 101. For example, the upper cylinder chambers 38 can be filed with hydraulic fluid before the respective shutoff valves 42 are sealed so that the pistons 35 fill the respective cylinder chambers 39 and the respective rings 9 are maintained in their lowermost positions. Alternatively, the lower chambers 39 can be partly or completely filled with a hydraulic fluid so that the rings 9 of the roll 101 of FIG. 6 are kept in one of several intermediate positions or in their upper end positions.

Figure 7:
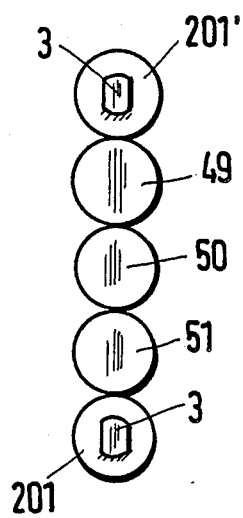
FIG. 7 is a smaller-scale end elevational view of a system of five rolls wherein at least the topmost and the lowermost rolls are constructed in a manner as shown in FIGS. 1-4, FIG. 4 or FIG. 5.

FIG. 7 shows a portion of a supercalender with five rolls 201', 49, 50, 51 and 201 which are disposed above each other. The rolls 201, 201' are identical with or analogous to the roll 1 of FIGS. 1–3, FIG. 4 or FIG. 5. The additional or intermediate rolls 49, 50 and 51 between the outer rolls 201, 201' are or can be standard calender rolls without deformable shells or with deformable shells mounted on standard hydrostatic supporting elements. If desired, one or more standard rolls (for example, the rolls 49 and 51 can have outer layers (see the layer 48 of FIG. 6) of elastomeric material. The roll 201 can be identical with the roll 201'. The end portions of the shells of these rolls can be maintained in selected intermediate or upper or lower end positions by arresting units of the type shown at 45 in FIG. 3.

FIGS. 6 and 7 show that the carriers 3 or bearing means 47 are fixed in their operative positions. However, it is clear that such carriers and bearing means can be rapidly lowered or caused to conform to different roll diameters. The carriers 3 are mounted in such a way that the primary supporing elements 6 are adjacent the neighboring nips and the secondary supporting elements 7, 107 or 207 are remote from such nips.

The outer rolls 201 and 201' operate counter to each other and render it possible to further reduce the sum of forces which the supporting elements must transmit to the shells of such rolls. This, in turn, entails a further reduction of friction between the supporting elements and the respective shells, i.e., a further reduction of the generation of heat. The utilization of identical outer rolls contributes to simplicity of the machine because the number of different rolls which must be kept in storage at the locale of use can be reduced accordingly.

In order to treat a selected web of paper or the like, it is necessary to select the width of the nip or nips and the pressure of the rolls upon the running web with a high degree of accuracy. This can be achieved by properly selecting the pressure in the cylinder chambers of the pressure generating devices for the primary and secondary supporting elements as well as by properly selecting the pressure in the cylinder and piston units of the arresting means 45. As mentioned above, the pressure generating devices for the primary and secondary supporting elements can be assembled into groups of two or more to simplify the controls for the supporting elements without unduly affecting the accuracy with which the shape of the respective shell 2 can be regulated and/or the pressure upon the running web in the longitudinal direction of the respective nip can be varied. It is always possible to select the positions of the rings 9 for a shell 2 in such a way that the sum of all forces which are to be generated by the respective primary and secondary supporting elements 6 and 7, 107 or 207 equals zero or is reduced to an acceptable minimum. This can be ascertained on the basis of relatively simple experiments. As a rule, a modern system of rolls is equipped with a computer which furnishes the desired reference values. As mentioned above, relatively small secondary supporting elements 7, 107 or 207 render it possible to greatly reduce friction with the shell and to reduce friction heat accordingly.

It is further possible to replace the hydraulic arresting units of the type corresponding to the unit 45 of FIG. 3 with mechanical or other arresting units. Hydraulic arresting units are preferred in many instances because they can be adjusted in a simple and time-saving as well as efficient way. The illustrated chambers of the arresting unit of FIG. 3 45 can be replaced with bellows, corrugated tubes or the like.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A system of rolls for use in forming a nip in calenders and like machines, comprising a first roll including a carrier, a deformable hollow cylindrical shell rotatably surrounding said carrier, said shell having an internal surface and first and second end portions and being movable radially relative to the carrier, first supporting elements forming at least one first row and interposed between said carrier and said internal surface, said first supporting elements having first surfaces adjacent the internal surface of said shell, second supporting elements forming at least one second row and interposed between said carrier and said shell opposite said first supporting elements, said second supporting elements having second surfaces adjacent said internal surface, at least some of said second surfaces being smaller than said first surfaces, first pressure generating devices having hydraulic cylinder and piston units for urging said first supporting elements toward the internal surface of said shell, and second pressure generating devices having hydraulic cylinder and piston units for urging said second supporting elements toward the internal surface of said shell while said first supporting elements are urged toward the internal surface of the shell when the machine embodying the first roll is in use in forming said nip, each of said units including a piston member and a cylinder member, one of said members being connected with said carrier and the other of said members being connected with the respective supporting element; and a second roll defining with the first roll a nip adjacent the first supporting elements.

2. The system of claim 1, wherein said supporting elements are hydrostatic supporting elements and said surfaces thereof have fluid-containing pockets.

3. The system of claim 2, wherein said pressure generating devices are adjustable and further comprising means for adjusting said pressure generating devices to thereby vary the force with which the respective supporting elements are urged toward said internal surface.

4. The system of claim 3, wherein the units of said first pressure generating devices include a group of units for each of said first supporting elements and the units of each group are adjacent one another in the circumferential direction of said shell.

5. The system of claim 3, wherein the piston members of at least some units for said second supporting elements have smaller cross-sectional areas than the piston members of the units for said first supporting elements.

6. The system of claim 5, wherein the cross-sectional areas of pistons of said at least some units for said second supporting elements equal or approximate fifty percent of the cross-sectional areas of pistons of the units for said first supporting elements.

7. The system of claim 3, wherein the areas of said at least some second surfaces equal or approximate fifty percent of the areas of said first surfaces.

8. The system of claim 3, further comprising a third roll, said second roll being disposed between said first roll and said third roll, said third roll comprising a carrier, a deformable hollow cylindrical shell surrounding the respective carrier and supporting elements interposed between the carrier and the shell of said third roll.

9. A system of rolls for use in forming a nip in calenders and like machines, comprising a roll including a carrier; a deformable hollow cylindrical shell rotatably surrounding said carrier, said shell having an internal surface and first and second end portions and being movable radially relative to said carrier; first hydrostatic supporting elements forming at least one first row and interposed between said carrier and said internal surface, said first supporting elements having first surfaces adjacent the internal surface of said shell and provided with fluid-containing pockets; second hydrostatic supporting elements forming at least one second row and interposed between said carrier and said shell opposite said first supporting elements, said second supporting elements having second surfaces adjacent said internal surface and provided with fluid-containing pockets, at least some of said second surfaces being smaller than said first surfaces and the supporting elements of said second row being more distant from one another than the supporting elements of said first row; adjustable first and second pressure generating devices having first and second hydraulic cylinder and piston units for respectively urging said first and second supporting elements simultaneously toward said internal surface while the machine embodying the roll is in use in forming said nip, each of said units including a cylinder member and a piston member, one of said members being connected with said carrier and the other of said members being connected with the respective supporting element; and means for adjusting said pressure generating devices to thereby vary the force with which the respective supporting elements are urged toward said internal surface.

10. A system of rolls for use in forming a nip in calenders and like machines, comprising a roll including a carrier; a deformable hollow cylindrical shell rotatably surrounding said carrier, said shell having an internal surface and first and second end portions and being movable radially relative to the carrier; first hydrostatic supporting elements forming at least one first row and interposed between said carrier and said internal surface, said first supporting elements having first surfaces adjacent the internal surface of said shell and provided with fluid-containing pockets; second hydrostatic supporting elements forming at least one second row and interposed between said carrier and said shell opposite said first supporting elements, said second supporting elements having second surfaces adjacent said internal surface and provided with fluid-containing pockets, at least some of said second surfaces being smaller than said first surfaces, the first supporting elements of said first row including two outermost elements each disposed at a first distance from the respective end portion of said shell and the second supporting elements of said second row including two outermost elements each disposed at a greater second distance from the respective end portion of said shell; and first and second pressure generating devices having first and second hydraulic cylinder and piston units for respectively urging said first and second supporting elements simultaneously toward said internal surface while the machine embodying the roll is in use in forming said nip, each of said units including a cylinder member and a piston member, one of said members being connected with said carrier and the other of said members being connected with the respective supporting element.

11. A system of rolls for use in calenders and like machines, comprising a roll including a carrier; a deformable hollow cylindrical shell rotatably surrounding said carrier, said shell having an internal surface and first and second end portions and being movable radially relative to the carrier; first hydrostatic supporting elements forming at least one first row and interposed between said carrier and said internal surface, said first supporting elements having first surfaces adjacent the internal surface of said shell and provided with fluid-containing pockets; second hydrostatic supporting elements forming at least one second row and interposed between said carrier and said shell opposite said first supporting elements, said second supporting elements having second surfaces adjacent said internal surface and provided with fluid-containing pockets, at least some of said second surfaces being smaller than said first surfaces; a substantially annular support for each end portion of said shell, said supports surrounding said carrier within the respective end portions and being movable relative to said carrier radially of said shell; and means for arresting said supports in selected positions with reference to said carrier.

12. The system of claim 11, wherein said arresting means comprises at least cylinder and piston unit operating between said carrier and each of said supports, a source of pressurized fluid, conduit means connecting said source with said units, and flow regulating valve means in said conduits.

13. The system of claim 11, wherein said valve means comprises a shutoff valve in said conduits between said source and each of said units.

* * * * *